US012703582B2

(12) United States Patent
Kosinski et al.

(10) Patent No.: US 12,703,582 B2
(45) Date of Patent: Aug. 11, 2026

(54) SERIAL MULTI-UP EFFECTOR AND ROTARY TABLE FOR USE IN AN AUTOMATED ASSEMBLY LINE

(71) Applicant: ATS Automation Tooling Systems Inc., Cambridge (CA)

(72) Inventors: Paul Kosinski, Rolling Meadows, IL (US); Alexander Joseph Folz, Park Ridge, IL (US); Mateus de Camargo Jonas, Chicago, IL (US); Howard F. Speiden, Bensenville, IL (US)

(73) Assignee: ATS Automation Tracking System Inc., Cambridge (CA)

(*) Notice: Subject to any disclaimer, the term of this patent is extended or adjusted under 35 U.S.C. 154(b) by 453 days.

(21) Appl. No.: 18/207,795

(22) Filed: Jun. 9, 2023

(65) Prior Publication Data

US 2023/0399182 A1 Dec. 14, 2023

Related U.S. Application Data

(60) Provisional application No. 63/350,643, filed on Jun. 9, 2022.

(51) Int. Cl.
*B65G 47/90* (2006.01)
*B23P 21/00* (2006.01)

(52) U.S. Cl.
CPC ............ *B65G 47/90* (2013.01); *B23P 21/006* (2013.01)

(58) Field of Classification Search
CPC ............................... B65G 47/90; B23P 21/006
See application file for complete search history.

(56) References Cited

U.S. PATENT DOCUMENTS 4,911,598 A 3/1990 Sarvary
6,086,321 A * 7/2000 Takahashi .............. B25J 9/1612 414/793
7,234,744 B2 * 6/2007 Osten .................. B25J 15/0616 414/737
2011/0193363 A1 * 8/2011 Nishiwaki .............. G01L 5/167 901/33
2017/0369244 A1 * 12/2017 Battles ................. B65G 47/902
2018/0374144 A1 * 12/2018 Smilowitz .............. B25J 9/0093
2019/0071261 A1 * 3/2019 Wertenberger ........ B25J 9/1697
2019/0176326 A1 * 6/2019 Bingham ............... B25J 9/1612
2019/0261565 A1 * 8/2019 Robertson ......... G06F 18/24323
2020/0094412 A1 * 3/2020 Casse ...................... G01L 5/226
2020/0156260 A1 * 5/2020 Takasaki .................. B25J 9/142
2020/0170120 A1 5/2020 Hashimoto
2021/0368685 A1 * 12/2021 Wisdom ............... G06V 20/188
(Continued)

FOREIGN PATENT DOCUMENTS

EP 2500150 A2 9/2012
JP H06-305551 A 11/1994

*Primary Examiner* — Kyle O Logan

(74) *Attorney, Agent, or Firm* — McDonnell Boehnen Hulbert & Berghoff LLP

(57) ABSTRACT

A serial multi-up effector can be used in an automated assembly line in order pick parts from a parts bin one after the other before placing them at a desired location. In an automated assembly line, a parts bin will be depleted of parts and need to be replaced with a full parts bin. The bin replacement may be replaced using a rotary table that allows an empty bin to be replaced with a full bin. Additionally, the rotary table allows for filling of the empty bins while the full bins are being used to pick parts from.

20 Claims, 15 Drawing Sheets

(56) References Cited

U.S. PATENT DOCUMENTS

| | | | | |
|---|---|---|---|---|
| 2022/0314281 | A1* | 10/2022 | Kalouche | B65G 47/915 |
| 2022/0340695 | A1* | 10/2022 | Rasmussen | C08F 20/06 |
| 2023/0095494 | A1* | 3/2023 | Simpson | B65G 1/0492 700/216 |
| 2023/0390941 | A1* | 12/2023 | Opoku | B25J 11/0045 |
| 2024/0051136 | A1* | 2/2024 | Holhjem | B25J 9/1666 |
| 2024/0234841 | A1* | 7/2024 | Moghimian | H01M 4/587 |
| 2025/0297947 | A1* | 9/2025 | Cao | G06T 5/70 |

* cited by examiner

SERIAL MULTI-UP EFFECTOR AND ROTARY TABLE FOR USE IN AN AUTOMATED ASSEMBLY LINE

CROSS-REFERENCE TO RELATED APPLICATIONS

This application claims the benefit of priority of U.S. Provisional Patent Application No. 63/350,643, filed Jun. 9, 2022, which is hereby incorporated herein by reference in its entirety.

TECHNICAL FIELD

The current disclosure relates to automated assembly lines and in particular to a serial multi-up effector and a rotary table for use in the automated assembly lines.

BACKGROUND

Assembly line automation uses a wide range of components to move parts through the assembly process. The assembly line may comprise a number of different stations at which one or more operations may be performed towards production of a final product. One such operation is commonly referred to as picking and placing, in which an assembly line robot may pick a part or component from one location and place it at another location. As an example, picking and placing may comprise picking a part from a holding bin of parts and then placing it on a part tray that arranges the part for a subsequent operation. It will be appreciated that picking and placing operations may have a wide range of applications that generally involve the robot picking a part up from among a plurality of parts, and placing the part in a particular location and/or orientation.

In order to meet a desired delivery rate of placed parts, an assembly line may use multiple robots to place more parts in the same amount of time, or may delivery multiple parts with each placement. It is possible to pick-up multiple parts using a multi-up effector, which can increase the processing speed of the picking and placing. Such multi-up effectors rely on the parts being in an expected orientation that allows the individual effectors of the multi-up effector to contact all of the parts being picked at the same time. Such multi-up effectors operate in parallel and rely upon the parts to be picked being orientated in a position that allows each of the effectors to pick-up the respective parts at the same time. The use of multi-up effectors may result in cost savings as the same placement rate may be achieved using fewer assembly line robots. However, when the orientation of the parts may be variable or random, or prone to movement during retrieval, the use of existing solutions cannot reliably retrieve multiple parts with one effector.

When picking and placing parts from a bin, the bin will need to be periodically replaced with bin full of parts. Replacing the bin may require human intervention. In such situations, movement of the assembly line robots should be stopped while the human is placing the bins. Such stopping is undesirable. A conveyor belt may be used to move bins in and out of the picking location, however such an arrangement can require a relatively large footprint as well as coordination of workers to ensure the bins are placed on and removed from the conveyors in a timely manner.

Therefore there is a need for improved serial multi-up effector and a rotary table for use in an automated assembly lines.

BRIEF DESCRIPTION OF THE DRAWINGS

Further features and advantages of the present disclosure will become apparent from the following detailed description, taken in combination with the appended drawings, in which.

DETAILED DESCRIPTION

Figures 1A, 1B:
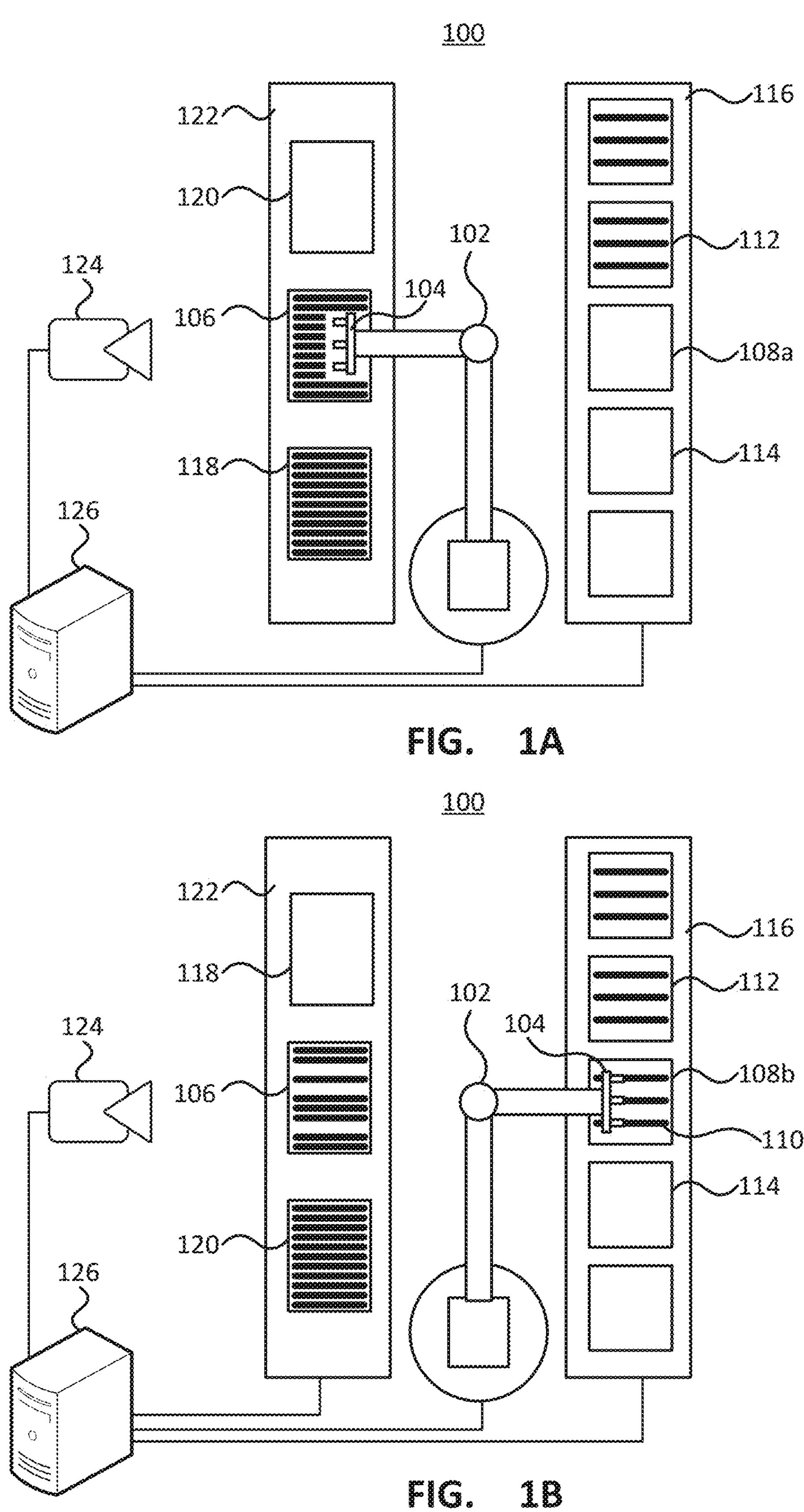
FIGS. 1A and 1B depict a portion of an automated assembly line using a serial multi-up effector.

In accordance with the present disclosure there is provided a multi-up effector for an assembly line robot capable of moving an end point along one or more axes, the multi-up effector comprising: a frame coupled to the end point of the moveable assembly providing a plurality mounting points; and a plurality of pick-up effectors, each of the individual effectors secured to a respective one of the plurality of mounting points of the frame and moveable between: a pick-up position in which the respective individual effector is capable of picking up a part from among a plurality parts; and a holding position in which the respective individual effector is capable of holding the part to the respective individual effector while the multi-up effector is moved to place a different individual effector in the pick-up position.

In accordance with a further embodiment of the multi-up effector, the frame further comprises a connection for securing the frame to the end point of the moveable assembly.

In accordance with a further embodiment of the multi-up effector, the plurality of effectors are movable between the respective pick-up positions and holding positions by rotation of the frame about the connection.

In accordance with a further embodiment of the multi-up effector, the plurality of effectors are movable between the respective pick-up positions and holding positions by extending and retracting respective ones of the plurality effectors relative to the frame.

In accordance with a further embodiment of the multi-up effector, one or more of the plurality of effectors each comprise a vacuum based effector.

In accordance with a further embodiment of the multi-up effector, each vacuum based effector comprises a pair of vacuum tubes.

In accordance with a further embodiment of the multi-up effector, the vacuum tubes are slidable along a longitudinal axis of the vacuum tubes and biased towards a fully extended position by a spring element.

In accordance with a further embodiment of the multi-up effector, one or more of the plurality of effectors each comprise a mechanical effector movable to engage with a respective one of the plurality of parts.

In accordance with a further embodiment of the multi-up effector, the mechanical effector slidable along a the frame and biased towards a fully extended position by a spring element.

In accordance with the present disclosure there is further provided an assembly line robot comprising: a moveable assembly comprising one or more actuators arranged to move an end point of the moveable assembly along one or more axes; and a multi-up effector coupled to the end point of the moveable assembly comprising a plurality of individual effectors, each of the individual effectors moveable between: a pick-up position in which the respective individual effector is capable of picking up a part from among a plurality parts; and a holding position in which the respective individual effector is capable of holding the part to the respective individual effector while the multi-up effector is moved to place a different individual effector in the pick up position.

In accordance with a further embodiment of the assembly line robot, the moveable assembly comprises one of: an articulated arm assembly; a Selective Compliance Articulated Robot Arm (SCARA) assembly; a delta arm assembly; and a gantry assembly.

In accordance with a further embodiment of the assembly line robot, the frame of the multi-up effector further comprises a connection for securing the frame to the end point of the moveable assembly.

In accordance with a further embodiment of the assembly line robot, the plurality of effectors of the multi-up effector are movable between the respective pick-up positions and holding positions by rotation of the frame about the connection.

In accordance with a further embodiment of the assembly line robot, the plurality of effectors of the multi-up effector are movable between the respective pick-up positions and holding positions by extending and retracting respective ones of the plurality effectors relative to the frame.

In accordance with a further embodiment of the assembly line robot, one or more of the plurality of effectors each comprise a vacuum based effector.

In accordance with a further embodiment of the assembly line robot, each vacuum based effector comprises a pair of vacuum tubes.

In accordance with a further embodiment of the assembly line robot, the vacuum tubes are slidable along a longitudinal axis of the vacuum tubes and biased towards a fully extended position by a spring element.

In accordance with the present disclosure there is further provided an assembly station for use in an assembly line comprising: an assembly line robot comprising: a moveable assembly comprising one or more actuators arranged to move an end point of the moveable assembly along one or more axes; and a multi-up effector coupled to the end point of the moveable assembly comprising a plurality of individual effectors, each of the individual effectors moveable between: a pick-up position in which the respective individual effector is capable of picking up a part from among a plurality parts; and a holding position in which the respective individual effector is capable of holding the part to the respective individual effector while the multi-up effector is moved to place a different individual effector in the pick-up position; a delivery assembly for positioning a bin filled with parts to a picking position to allow the multi-up effector to pick parts out from the bin and removing an at least partially empty bin from the picking position; a removal assembly for positioning an empty part holder to a placing positon to allow the multi-up effector to deliver the picked parts to the part holder and remove an at least partially filled parts holder from the placing position.

In accordance with a further embodiment of the assembly station, the removal assembly comprises a conveyor mechanism.

In accordance with a further embodiment of the assembly station, the delivery assembly comprises a conveyor mechanism.

In accordance with a further embodiment of the assembly station, the delivery assembly comprises a rotary table having at least two bin locations, where respective ones of the two bin locations are rotatable between being located in either the picking position or a filling position.

In accordance with a further embodiment of the assembly station, the rotary table comprises a safety partition between the two bin locations.

In accordance with a further embodiment of the assembly station, the assembly line robot continues to operate while an operator is providing a filled parts bin at the filling position.

In accordance with a further embodiment of the assembly station, the filling position is located within a safety enclosure with a door and the rotary table is prevented from rotating when the door is open or while the operator is within the enclosure.

In accordance with a further embodiment of the assembly station, the assembly station further comprises a second assembly line robot comprising a second multi-up effector.

In accordance with a further embodiment of the assembly station, the rotary table comprises at least four bin locations arranged such that two bin locations are located at respective picking positions and the other two bin locations are located at respective filling positions.

In accordance with a further embodiment of the assembly station, the assembly station further comprises at least one camera system arranged to capture image data of parts located in bin for use in determining one or more target parts to be picked.

In accordance with a further embodiment of the assembly station, the assembly station further comprises at least one processor used for controlling at least one or more of an assembly line robot, the delivery assembly, the removal assembly, and the camera system.

In accordance with a further embodiment of the assembly station, the moveable assembly comprises one of: an articulated arm assembly; a Selective Compliance Articulated Robot Arm (SCARA) assembly; a delta arm assembly; and a gantry assembly.

In accordance with a further embodiment of the assembly station, the frame of the multi-up effector further comprises a connection for securing the frame to the end point of the moveable assembly.

In accordance with a further embodiment of the assembly station, the plurality of effectors of the multi-up effector are movable between the respective pick-up positions and holding positions by rotation of the frame about the connection.

In accordance with a further embodiment of the assembly station, the plurality of effectors of the multi-up effector are movable between the respective pick-up positions and holding positions by extending and retracting respective ones of the plurality effectors relative to the frame.

In accordance with a further embodiment of the assembly station, one or more of the plurality of effectors each comprise a vacuum based effector.

In accordance with a further embodiment of the assembly station, each vacuum based effector comprises a pair of vacuum tubes.

In accordance with a further embodiment of the assembly station, the vacuum tubes are slidable along a longitudinal axis of the vacuum tubes and biased towards a fully extended position by a spring element.

In accordance with the present disclosure there is further provided a rotary table for use in an assembly line, the rotary table comprising: a base table; an upper table comprising: first and second bin locations on an upper surface of the upper table, each of the bin locations arranged to receive a respective bin of parts to be picked by an assembly line robot of the assembly line; and at least one bearing support arranged on a lower surface of the upper table and supporting the upper table above the base table, the at least one bearing support allowing rotation of the upper table allowing positions of the first and second bin locations within the assembly line to be switched between a picking position and a filling position.

In accordance with a further embodiment of the rotary table, the rotary table further comprises: a safety partition secured to the upper table between the first and second bin locations to separate the picking position and the filling position during operation of the assembly line to provide a safe location to fill the bin of parts.

In accordance with a further embodiment of the rotary table, the rotary table further comprises: a rotary actuator secured to the base table and the upper table to rotate the upper table and switch the first and second bin locations on the upper surface between the picking position and the filling position.

In accordance with a further embodiment of the rotary table, each of the first and second bin locations are sized to support two bins.

In accordance with a further embodiment of the rotary table, the at least one bearing support each extend away from the lower surface of the upper table and bear against an upper surface of the upper table.

In accordance with a further embodiment of the rotary table, the at least one bearing support each comprise of wheeled support.

In accordance with a further embodiment of the rotary table, the at least one bearing support of the upper table each comprise a bearing surface that bears against at least one lower bearing support that each extend away from an upper surface of the base table.

In accordance with a further embodiment of the rotary table, the at least one lower bearing support each comprise a wheeled support.

In accordance with a further embodiment of the rotary table, the rotary table further comprises a cable channel arranged on an upper surface of the base table providing a channel for one or more cables to protect the one or more cables during rotation of the upper table.

In accordance with a further embodiment of the rotary table, the rotary table further comprises a base support to support the base table above a ground surface.

In accordance with the present disclosure there is further provided a method of picking and placing parts in an assembly line, the method comprising: capturing image data of a plurality of parts arranged in a picking bin; identifying one or more possible parts within the image data suitable for picking out of the picking bin; moving a first effector of a multi-up effector arranged on an end point of an assembly line robot to a position to pick-up a first target part from the one or more possible parts and attempting to pick-up the first target part with the first effector; moving the first effector to a holding position; moving a second effector of the multi-up effector to a position to pick-up a second target part from among the plurality of parts and attempting to pick-up the second target part with the second effector; and moving the first and second effectors to deliver the respect target part to a first delivery target and second delivery target respectively.

In accordance with a further embodiment of the method, identifying one or more possible parts within the image data comprises identifying a plurality of possible parts, including the first target part and the second target part from the image data.

In accordance with a further embodiment of the method, the method further comprises capturing additional image data of the plurality of parts after moving the first effector to the holding position and determining the second target part from the additional image data.

In accordance with a further embodiment of the method, moving the second effector of the multi-up effector to the position to pick-up the second target part moves the first effector to the holding position.

In accordance with a further embodiment of the method, moving the first effector and the second effector of the multi-up effector comprises rotating the multi-up effector about a connection point connecting the multi-up effector to an automated assembly robot.

In accordance with a further embodiment of the method, moving the first effector of the multi-up effector comprises extending the first effector away from a connection point connecting the multi-up effector to an automated assembly robot and moving the second effector of the multi-up effector comprises extending the second effector away from the connection point.

In accordance with a further embodiment of the method, the method further comprises determining if the attempt to pick-up the first target part is successful and if the attempt is not successful determining if a number of failed pick-up attempts is greater than a threshold value and when the number of failed pick-up attempts is greater than the threshold value, replacing the picking bin with a new picking bin filled with parts.

In accordance with a further embodiment of the method, attempting to pick-up the first target part comprises attempting to pick-up the target part a set number of times.

In accordance with a further embodiment of the method, replacing the picking bin with the new picking bin comprises causing a rotary table to rotate in order to replace the picking bin with the new picking bin.

In accordance with a further embodiment of the method, rotating the rotary table comprises determining that a working area is clear of individuals and a door securing the working area is closed before rotating the rotary table.

In accordance with the present disclosure there is further provided a method of operating a rotary table in an automated assembly line, the method comprising: determining one or more possible pick parts from among a plurality of parts from a first parts bin arranged on a rotary table at a picking location; using an end effector to pick-up at least one of the possible pick parts from the first parts bin; placing the at least one of the pick parts picked up by the end effector to at least one desired placing location; determining that the first parts bin should be replaced with a full parts bin; and operating the rotary table to rotate a second parts bin from a filling location to the picking location and rotate the first parts bin from the picking location to the filling location.

In accordance with a further embodiment of the method, determining that the first parts bin should be replaced comprises determining that a number of parts remaining in the first bin is below a set replacement number.

In accordance with a further embodiment of the method, determining that the first parts bin should be replaced comprises determining that a number of the determined possible pick parts in bellow a possible pick replacement threshold.

In accordance with a further embodiment of the method, determining that the first parts bin should be replaced comprises determining that a number of failed attempts to pick-up the at least one possible pick parts exceeds a failure threshold.

In accordance with a further embodiment of the method, the method further comprises at least one of: refilling the first parts bin in the filling location with parts while parts are being picked from the second parts bin in the picking location; and replacing the first parts bin in the filling location with a third parts bin full of parts while parts are being picked from the second parts bin in the picking location.

In accordance with a further embodiment of the method, the method further comprises performing a safety check to ensure it is safe to rotate the rotary table prior to rotating the table.

In accordance with a further embodiment of the method, the safety check comprises checking to ensure an enclosure door is closed.

In accordance with a further embodiment of the method, the safety check comprises checking to ensure no individual is in proximity to the rotary table.

In accordance with a further embodiment of the method, the assembly line robot continues to operate while it is unsafe to rotate the rotary table.

In accordance with a further embodiment of the method, the rotary table comprises at least four bin positions, with two being arranged in the filling location and two being located in the picking location at a time.

An automated assembly line may have one or more stations as part of the assembly line where different operations are performed toward the assembly or manufacture of a product. One such operation may comprise picking parts from a bin and placing the parts into a desired location, such as onto a tray that positions the parts for subsequent operations. A multi-up end effector at an end of an assembly robot allows multiple parts to be picked up in on operation between the bin and the assembly line, by picking up the parts one after the other, from the bin and then placed at respective locations, again one by one. The multi-up effector is moved so that individual effectors are able to pick-up a respective part from the bin. By serially picking the parts from the bin, it is possible to pick multiple parts even when parts may not be aligned or orientated in a desired position by re-orienting the position of the end effector between picks allowing the multiple effectors to retrieve multiple parts in one action. A serial multi-up effector may provide greater speed for placing parts in the desired positions while also providing flexibility with regard to the arrangement of the parts in the bins being picked from particularly when the parts are not oriented in a consistent fashion.

When picking and placing parts from a bin, the bin of parts will be depleted and will need replacing. In order to speed up the bin replacement, while still providing a safe environment for workers filling and replacing the bins, a rotary table may be used that allows empty bins to be quickly rotated out of the picking location and filled bins being rotated into the picking location. The rotating table can rotate the empty bins into a location that allows them to be safely refiled, or replaced with filled bins while providing seamless operation of the assembly robot.

FIGS. 1A and 1B depict a portion of an automated assembly line using a serial multi-up effector. The portion or station 100 of the automated assembly line may be one of a plurality different stations of the assembly line. The station 100 comprises an automated assembly line robot 102, which is depicted as an articulated arm assembly 102. Although depicted as an articulated robotic arm assembly, the assembly line robot may be provided using different types of robotics. For example, the assembly line robot may be provided by a Selective Compliance Articulated Robot Arm (SCARA) assembly, a delta arm assembly, or a gantry assembly. Regardless of the particular type of the assembly line robot used, the assembly line robot is capable of moving a serial multi-up end effector 104.

The serial multi-up effector 104 is depicted as having three individual effectors that can be individually positioned to pick-up a part from a picking location 106. A plurality of the parts may be held in a bin that provides enough parts to allow the assembly line robot to proceed for a period of time without stopping to replace an empty bin. The number of parts in a bin may depend upon a number of factors including, for example how fast the parts need to be placed, how long it takes to switch out an empty bin for a full bin, how long it takes to fill bins with parts as well as how many full bins may be present as a buffer.

The serial multi-up effector 104 may be operated to pick-up parts from the bin positioned at the picking location 106 one after the other for placing at a particular location 108*a*. The robotic arm 102 may then move the multi-up effector 104, and the held parts, to the delivery or placing location 108*b* as depicted in FIG. 1B. As depicted, each part 110 may be placed at the specific location. The parts 110 may be placed, for example, on a tray or other structure that arranges the parts 110 for one or more subsequent operations. Additionally, or alternatively, the parts 110 may be placed in a particular location on another component. Regardless of what the part is placed on, each part is placed at particular location, and once placed, they may be moved out of the placing location. For example, a parts tray may be loaded with parts at the placing location 108*b* and once full, it may be moved out of the placing location, depicted as position 112, and an empty tray 114 moved into the picking location 108*b*. Although depicted as trays, the parts may be placed on other components or structures. The empty and filled trays may be delivered into and out of the placing location 108*b* by delivery assembly such as a conveyor belt 116 or other similar device.

Similar to the conveyor belt 116 used to move empty 114 and filled trays 112 into and out of position on the placing side, filled bins 118 and empty bins 120 may be moved into and out of the picking position 106 by removal assembly such as a conveyor 122 or similar device. The parts in the bins are depicted as an elongated tube structure; however the multi-up effector may be used with a wide range of differently shaped parts.

A camera or imaging device 124 is arranged to capture image data of the parts in the bin at the picking position 106. The imaging device 124 may be arranged on the assembly line robot 102 or in stationary position such as above the picking location 106. The imaging data may be processed by a computing device 126 in order to identify one or more possible parts within the picking location that are in suitable orientations for being picked up by an effector of the multi-up effector 104. The parts may be arranged in generally the same orientation within the bin; however, not all of the parts may be available to be picked at a particular time. For example, the parts may be arranged in layers, so parts on the top block parts on the bottom. Further, one or more parts may be arranged at an angle on top of other parts. The size, shape and orientation of the parts may make certain parts more appropriate to be picked at a certain point in time. The imaging information captured by the imaging device 124 may be processed, by the imaging device and/or computing device 126, and/or other processors, to identify one or more of the parts within the bin to be picked and utilized to determine operational movement of the robotic arm 102. The multiple parts to be picked may be determined at the same time, or imaging data may be captured and processed after picking a part to identify the next part to be picked.

In addition to processing the imaging data, the computing device 126 may also control operation, or utilized in instructing the operation by another computing or controlling device, of the delivery assembly, the removal assembly, the assembly robot 102 and or the multi-up effector 104. Although depicted as a single computing device 124, it will be appreciated that the functionality may be provided by a plurality of separate controllers and/or processors.

As depicted in FIGS. 1A and 1B the assembly robot 102 and the serial multi-up effector 104 may be controlled to pick-up multiple parts from a picking location 106 and deliver them to a placing location 108. Although not explicitly depicted in FIGS. 1A and 1B, the multi-up effector 104 is controlled in order to pick-up an individual part at a time. Such operation can allow for picking of multiple parts from a bin that may be oriented in positions that make it impossible, or difficult to pick-up multiple parts simultaneously. The serial operation of illustrative multi-up effectors is described further below with reference to FIGS. 2A-2D and FIGS. 3A and 3B.

FIGS. 2A-2D depict operation of a serial multi-up effector. The effector 200 may be used as the effector 104 described above. The multi-up effector 200 comprises a frame 202 that allows the multi-up effector 200 to be mounted to an end point of the robotic arm 102. The mounting may be done by a connection 204 point which can be rotated or moved in one or more directions. The multi-up effector 200 is depicted as having three individual effectors 206*a*, 206*b*, 206*c* (referred to collectively as individual pick-up effectors 206), although other numbers of effectors are possible. The individual effectors 206 may be designed based on one or more of the shape, size, material, and weight of the parts being picked. The individual effectors 206 are depicted as vacuum based to pick-up the respective part. Each of the individual pick-up effectors 206 are programmed to retrieve from a respective pick-up area 208*a*, 208*b*, 208*c* (referred to collectively as pick-up areas 208). When an individual effector, such as pick-up effector 206*a* is operated, for example by applying a vacuum to the end of the individual effector 206, with a part in the pick-up area 208*a*, the part will be picked up by the effector. The effector 200 may be rotated about the connection point 204 in order to move which of the effectors 206 are in a position to pick-up a part and which are in a position to hold the picked up parts.

Figure 2A:
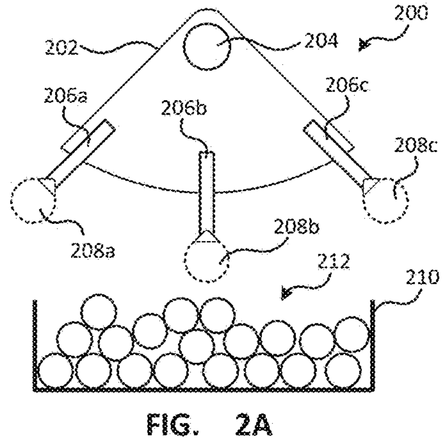
FIGS. 2A-2D depict operation of a serial multi-up effector.

Turning to FIG. 2A, the serial multi-up effector 200 is depicted with all of the individual pick-up effectors 206 arranged in a holding position, although none of the effectors are holding a part. The holding position is considered a position in which no parts are located within the pick-up area 208, allowing any parts that are held by the pick-up effectors 206 to remain held in place. It is noted that the individual effectors 206 may move while in the holding position.

For clarity of the figures, the effector 202 is depicted as being positioned above a bin 210 that holds a plurality of parts 212, however in reality it may be positioned away from the bin 210 in 3 dimensional space. Regardless, initially the individual pick-up effectors 206 are empty, for example after placing any held parts in the appropriate location.

Figure 2B:
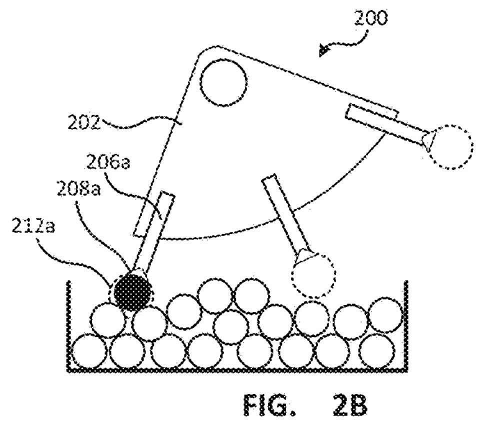

Image data of the parts 212 in the bin 210 may be captured and one or more possible parts that may be suitable for picking in the current multi-pick operation determined. A target part 212*a* from the identified possibilities is depicted in FIG. 2B as the black ball. With the target part 212*a* identified, the multi-up effector 200 is moved into a pick-up position for the identified target part. The pick-up position orients one of the effectors, depicted as effector 206*a*, so that the target part 212*a* is located within the effector's pick-up area 208*a*. The effector 206*a* may be moved into the pick-up position by rotation of the effector about the connection point 204 as well as Cartesian movement of the connection point 204 by the assembly line robot. Once the effector 206*a* is moved to the pick-up position, the effector 206*a* can be activated in order to pick-up and hold the target part 212*a*. The effector 206*a* is considered as a vacuum based effector and so a vacuum is applied to the effector causing the part to be held by suction on the end of the effector. The particular design of the effector used to pick-up and hold the effector may be varied based on the part being picked up and held.

Figure 2C:
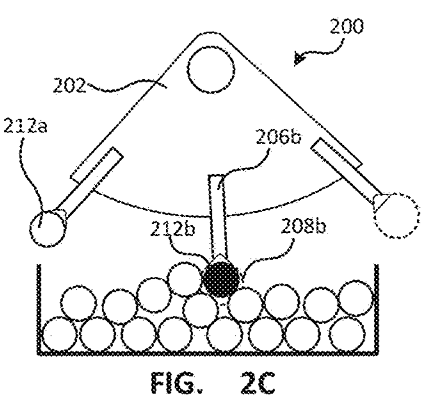
Figure 2D:
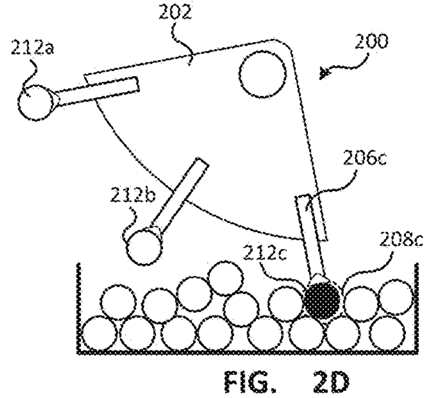

Once the target part 212*a* is picked up, another target part is identified, depicted as black circle 212*b* in FIG. 2C. The multi-up effector 200 is again moved to orient another effector not currently holding a part, depicted as effector 206*b* in the pick-up position by orienting the multi-up effector 200 so that the target part 212*b* is located within the pick-up area 208*b* of the individual effector 206*b*. Moving the individual effector 208*b* into the pick-up position depicted in FIG. 2C will also move the individual pick-up effector 206*a*, which has previously picked up and is holding the part 212*a*, into the holding position. With the individual effector 208*b* moved to the pick-up position, the individual effector 206*a* can be operated and the part 212*b* picked up.

The serial picking of parts may continue with picking another target part 212*c* by an individual effector 206*c*. The multi-up effector 200 is moved to orient the individual effector 206*c* so that the target part 212*c* is located within the pick-up area 208*c*. Movement of the individual effector 206*c* into the pick-up position will also move the other individual effectors 206*a*, 206*b* into the holding position.

Once each of the individual pick-up effectors 206 have picked up a part, the multi-up effector 200 may be moved to place the parts in a desired location. When placing the parts in the desired location, it is possible to either place the parts serially in a similar manner as the parts were picked up. Alternatively, it may be possible to place all of the parts simultaneously. For example a parts tray may be provided that is shaped similar to the arrangement of the individual effectors so that all of the held parts can be released into position simultaneously.

The above as described an ideal operation of the multi-up effector 200 in which each attempt to pick-up a target part results in successfully picking up the part. A successful pick may not always occur. The failure may occur for various reasons, including movement of the part or other parts resulting in blocking of the pick, failure of making a good seal with the part, friction between the target part and other parts, etc. Regardless of the reason for the pick failure, the failure may be handled in various ways. For example, the effector may attempt to re-pick the same target part again, possibly for a set number of attempts. If the target part cannot be successfully picked, another target part may be attempted to be picked possibly with the same individual effector or with another individual effector. Accordingly, each multi-pick operation may not result in the multi-up effector 200 placing the maximum number of parts. It will be appreciated that the particulars of how failed picks are handled may depend upon the details of the application.

FIGS. 2A-2D have depicted operation of a serial multi-up effector in which the individual effectors are fixed in position to a frame of the multi-up effector 200. Accordingly, rotational movement of the effector moves all of the individual effects such that one will be oriented in a pick-up position while the others are oriented in a holding position. It is possible to provide a serial multi-up effector in which the individual pick-up effectors can be moved between pick-up positions and holding positions without movement of the effector.

Figure 3A:
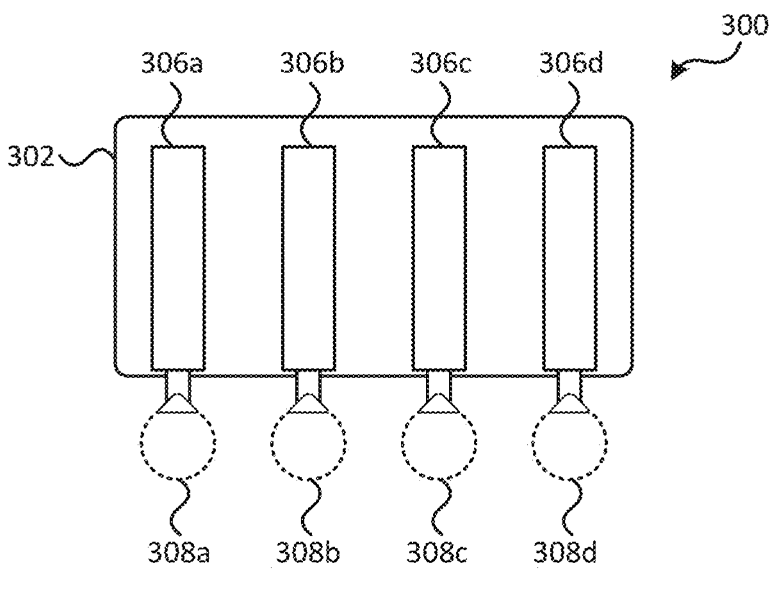
FIGS. 3A and 3B depict operation of a further serial multi-up effector.
Figure 3B:
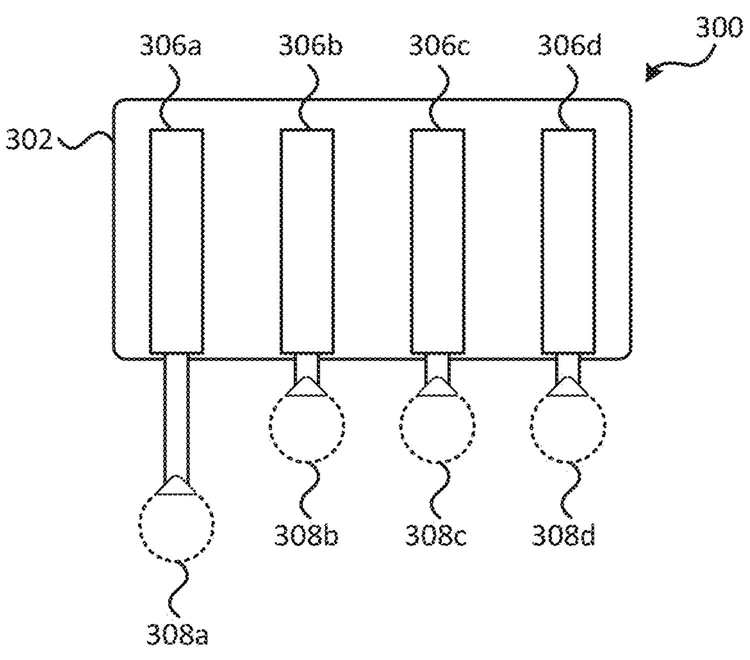

FIGS. 3A and 3B depict operation of a further serial multi-up effector. The serial multi-up effector 300 comprises a frame 302 that is mounted to an end of an assembly line robot and can be moved by the assembly line robot. The multi-up effector 300 comprises a plurality, depicted as four, individual pick-up effectors 306*a*, 306*b*, 306*c*, 306*d* (referred to collectively as individual pick-up effectors 306). In contrast to the individual pick-up effectors 206 that were fixed to the effector frame, the individual pick-up effectors 306 are moveably connected to the frame 302, allowing the individual pick-up effectors 306 to be extended and retracted away from and back to the frame.

Turning to FIG. 3A, all of the individual pick-up effectors 306 are retracted and in respective holding positions, although none of the pick-up effectors 306 are holding parts. As depicted, each of the individual pick-up effectors 306 has a respective pick-up area 308*a*, 308*b*, 308*c*, 308*d* (refereed to collectively as pick-up areas 308). Similar to the individual pick-up effectors 206 described above, when the pick-up effectors 306 are operated with a part located within the respective pick-up areas 308, the part will be picked up and held by the individual pick-up effectors 306. As depicted in FIG. 3B, an individual effector, depicted as pick-up effector 306*a*, can be moved from the holding position to the pick-up position by extending the pick-up effector 306*a* away from the frame 302. The pick-up effector 306*a* may then be operated to pick-up a part (not shown) and then retracted back to the holding position. The extension/retraction may be done using various types of actuators such as pneumatics, hydraulics, motors, etc.

The above has depicted pick-up effectors as being a vacuum or suction type of effector. The effector may be varied according to the parts being picked, including the shape and material of the parts. The effectors may include for example mechanical grippers that may be moved to engage with the part.

Figure 4:
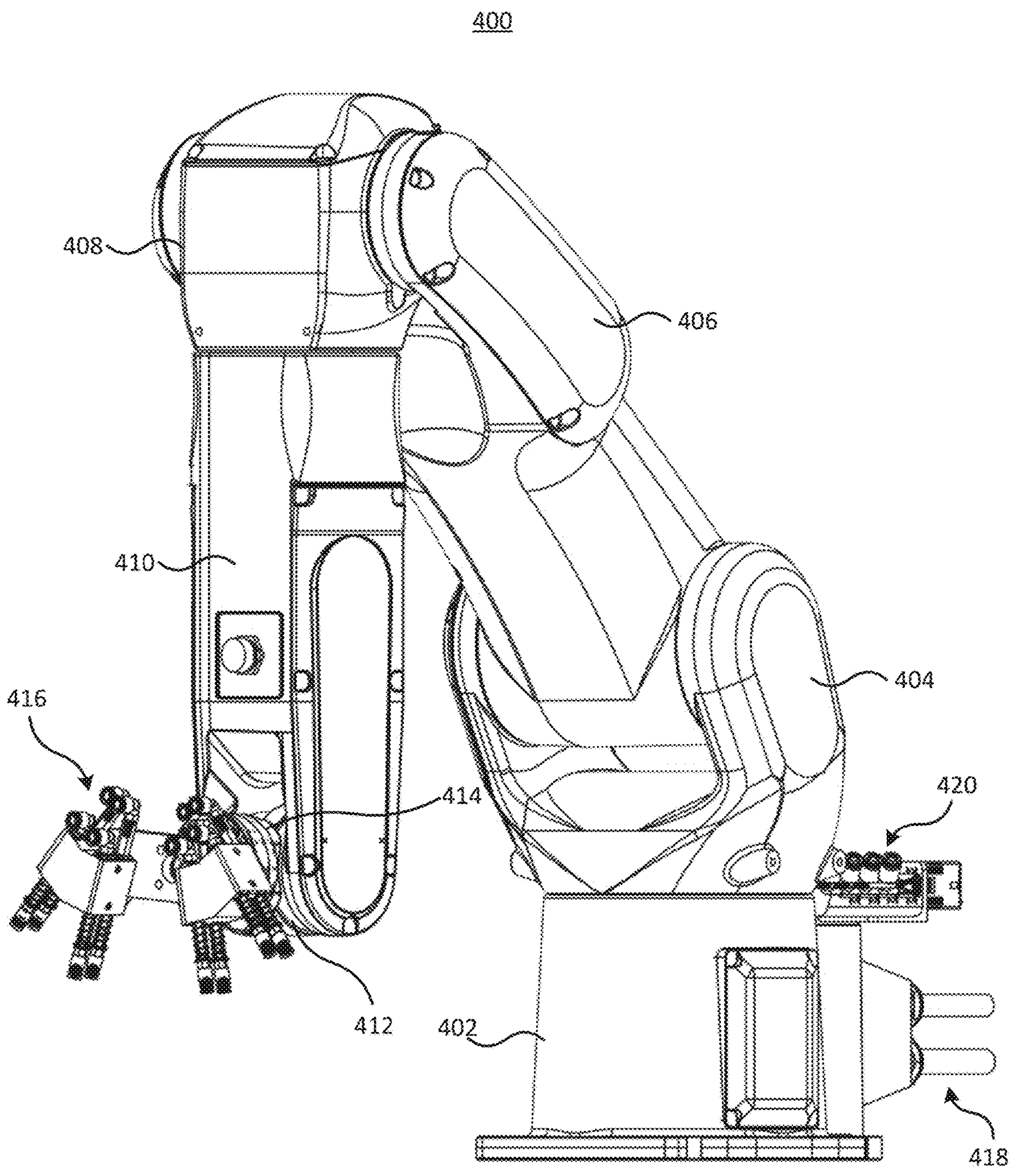
FIG. 4 depicts an illustrative assembly line robot with a serial multi-up effector.

FIG. 4 depicts an illustrative assembly line robot with a serial multi-up effector. It will is noted that not all of the components are depicted in FIG. 4, including for example wiring, pneumatic, hydraulic and vacuum lines, etc. The assembly line robot 400 is depicted as an articulated arm assembly. The assembly line robot 400 has a base 402 that allows the assembly robot 400 to be mounted and secured in position. In addition to securing the assembly robot 400 in place, the base may also provide a rotational movement to the articulated components of the assembly line robot. The articulated components are depicted as a plurality of arms or segments 404, 406, 408, 410 that are connected together. The assembly line robot may provide a number of degrees of freedom, including for example 2, 3, 4, 5, 6, and 7 degrees of freedom. The various degrees of freedom may include translations, and rotations of respective components. Each of the connection points between the different segments 404-410 provides a degree of freedom in the movement of the arm. An end point of the arm 412 may be rotatable couple to the last arm section 410 along a first axis. The end point may provide a connection point 414 that may also rotate about a second axis which may be perpendicular to the first axis.

An end multi-up effector 416 is mounted to the end point connection 414 in order to allow parts to be picked up and placed at a desired location. The multi-up end effector 416 is depicted as a vacuum-based serial multi-up effector. The multi-up effector 416 can be positioned by the assembly line robot in order to bring one of the individual effectors into a position that allows it to pick-up a part, for example from a bin of parts. The multi-up effector is depicted in further detail in FIGS. 5A-5C.

The automated assembly robot 400 may be hydraulically operated and may have one or more hydraulic input/output ports 418. Additionally, or alternatively, the automated assembly robot 400 may be electronically controlled and may comprise one or more electrical connections. Further, the automated assembly line robot 400 may include one or more vacuum manifolds 420 for distributing vacuum pressure to the individual effectors. The manifold 420 may also provide pressure sensors for monitoring a vacuum pressure applied by the individual effectors. The individual effectors are depicted as each comprising a pair of vacuum tubes. The pair of vacuum tubes may be monitored by a single vacuum sensor. Although only a single pressure sensor is used to monitor the pair of vacuum tubes, it is possible to determine if both of the vacuum tubes have a good seal with the part based on the single sensor.

Figure 5A:
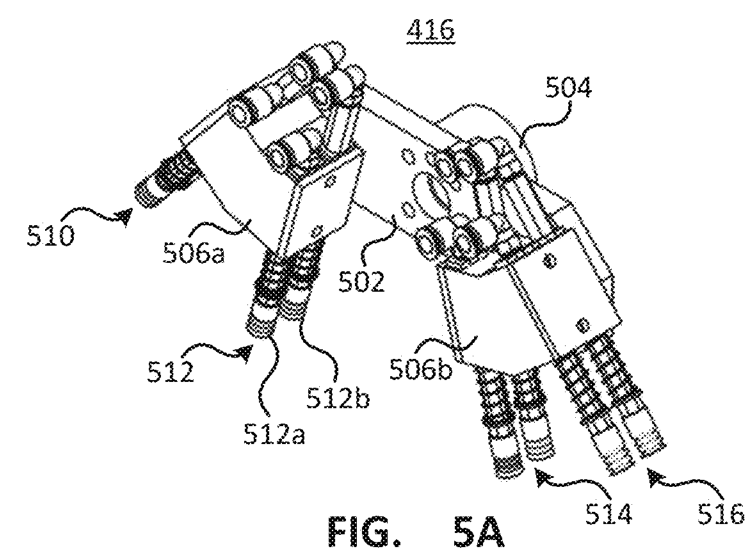
FIGS. 5A-5C depict different views of the serial multi-up effector.
Figure 5B:
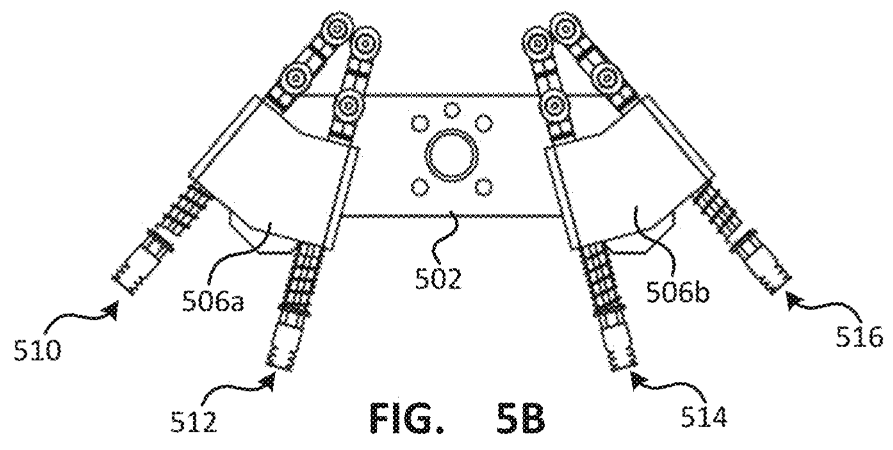
Figure 5C:
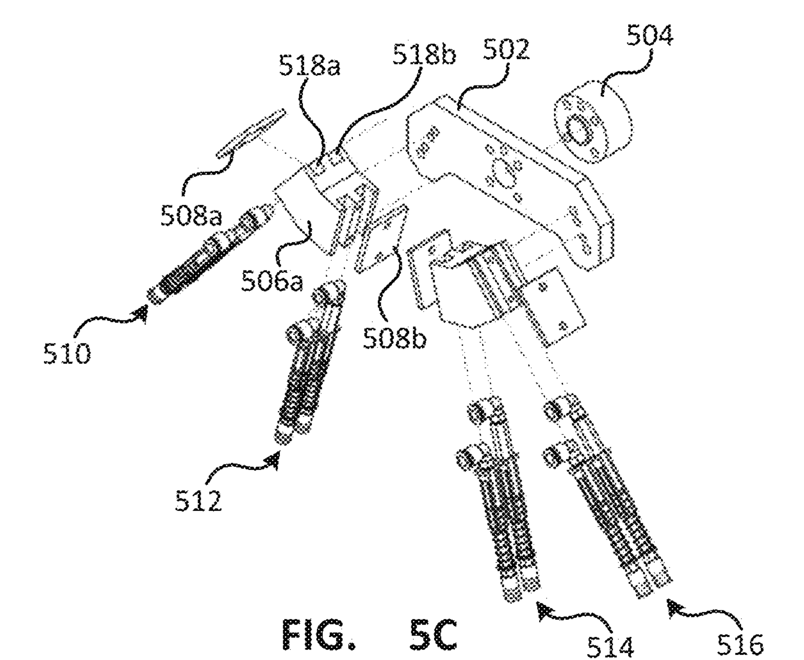

FIGS. 5A-5C depict different views of the serial multi-up effector 416. The multi-up effector 416 comprises a support frame 502 that provides the structure for mounting the individual effectors to the assembly line robot. A mounting connection 504 may be secured to the frame 502, for example by bolts, adhesives, welding etc. or the mounting connection may be formed as part of the frame 502. Regardless of the particular mounting of the connection 504 to the frame 502, it allows the multi-up effector 416 to be mounted to the end point of the assembly line robot. Mounting blocks 506*a*, 506*b* and pairs of mounting plates 508*a*, 508*b* may be used to secure the individual effectors 510, 512, 514, 516 to the frame. The assembly line robot is able to control the positioning of the multi-up effector and so the individual effectors 510, 512, 514, 516, allowing them to be moved between a pick-up position in which one of the effectors is able to pick-up a part and a holding position in which the individual effector is able to hold a part, if one has already been picked up. The assembly line robot may control the movement and positioning of the multi-up effector so that only a single one of the individual effectors is in the pick-up position at a time, with the other individual effectors in the holding position.

The multi-up effector 416 comprises four individual effectors 510, 512, 514, 516 that allow a tube-like part to be picked up and released in a desired place. It will be appreciated that different shaped parts may use different types of individual effectors. Each individual effector 510, 512, 514,

516 comprises a pair of vacuum tubes, although only the vacuum tubes 512*a*, 512*b* of individual effector 512 are numbered.

As depicted, the individual effectors 510, 512, 514, 516 are arranged with their respective ends in an arc about the connection point 504, which facilitates positioning the effectors so that only a single one is in a pick-up position at a time. The effectors are secured to the frame by two mounting blocks 506*a*, 506*b*. Each mounting block may have two pairs of channels formed within the block, one pair of which is labelled as 518*a*, 518*b*. Each channel receives an individual vacuum tube with each pair of channels providing the mounting location for the two vacuum tubes making up an individual effector. A covering plate 508*a*, 508*b* secures the vacuum tubes to the mounting block. It will be appreciated that other techniques for securing the vacuum tube to the frame 502 may be used.

Figure 6:
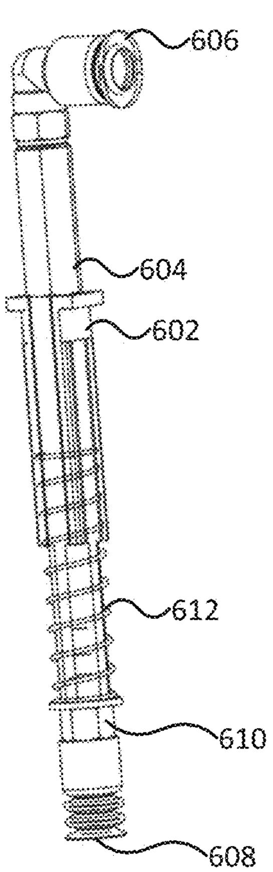
FIG. 6 depicts a vacuum tube of an individual effector.

FIG. 6 depicts a vacuum tube of an individual effector. The vacuum tube 512*b* depicted in FIG. 6 may be substantially the same as the other vacuum tubes. The vacuum tube comprises an outer body 602 that allows the vacuum tube to be mounted within the mounting block. An extension 604 may be provided in order to position a vacuum fitting 606 further away from the body 602. As seen in FIGS. 5A-5C, the position of the vacuum fittings for the tubes of the same individual effector are offset from each other in order to allow the close positioning of the tubes. The inclusion of the extension 604 in one of the vacuum tubes provides the offset of the vacuum fitting 606.

The vacuum tube 512*b* comprises a vacuum boot 608 at the end opposite the vacuum fitting 606. The vacuum boot 608 may be formed from a compliant material that allows the boot to conform to the surface of the part being picked up and so form a vacuum seal against the part. The boot 608 may be connected to a sliding piston 610 that can slide relative to the body 602. A biasing means, depicted as a spring 612, can bias the boot 608 away from the body. The biasing of the sliding piston may allow the boot to be further driven into the part being picked up in order to ensure a good seal is obtained.

The assembly line robot 400 and the serial multi-up effector 416 described above may be incorporated into an assembly line and used for picking and placing parts from a bin holding parts. The assembly line robot with the serial multi-up effector may be used in a wide variety of applications, including in applications in which the parts to be picked are arranged in a bin in a random ordering, that is the general orientation of the parts may be the same, however the exact position and orientation of the parts within the bin may not be controlled with enough precision to allow multiple effectors to reliably contact multiple parts at the same time. While the serial picking of parts may require more time to perform each individual pick in series, there may still be a speed advantage as the larger movements of the assembly line robot moving between the picking area and the placing area are not performed for each individual part. Instead, relatively small and fast movements are made to reposition the serial multi-up effector in order to pick multiple parts and then a larger and slower movement of the assembly line robot between the picking area to the placing area is performed with the multiple parts held by the effector.

Figure 7:
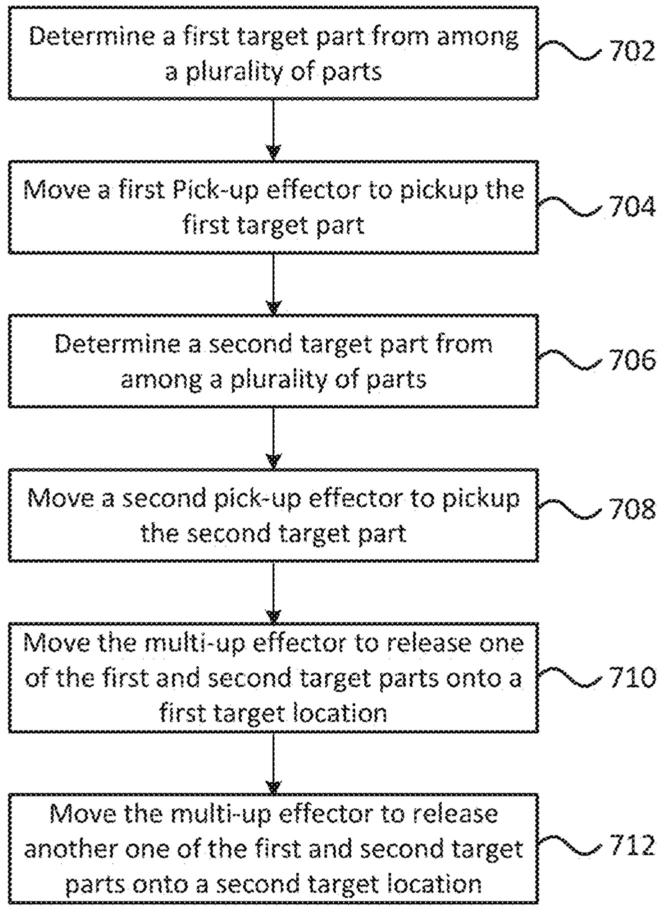
FIG. 7 depicts a method of serially picking and placing parts using a multi-up effector.

FIG. 7 depicts a method of serially picking and placing parts using a multi-up effector. The method 700 assumes that a camera or imaging device can provide image data of the parts in the bin. It will be appreciated that the imaging device may use various imaging techniques, including optical, infrared, x-ray, ultrasound, etc. to determine the orientation of one or more of the parts in the bin. Using the imaging data, the method determines a first target part from among the plurality of parts in the bin (702). The target part may be identified using image processing techniques that can identify one or more parts that are in a position to likely result in a successful pick. For example, the part may be one that is not blocked by other parts. Once the target part is identified, one of the pick-up effectors, referred to as first effector although it may be any effector not currently holding a part, is moved to a pick-up position in which the target part is located within the pick-up area of the effector (704). The effector is operated, for example by applying a vacuum to the effector, in order to pick-up the target part. A second target part is then identified from among the target parts (706). The second target part may for example be determined based on newly acquired image data and/or from the original image data. With the second part identified, another effector, referred to as a second effector although any effector not holding a part may be used, is moved to a pick-up position in which the second target part is located within the pick-up area of the effector (708). In order to enable the second part to be picked up the multi-up effector body can be rotated or moved so that the first part is moved away from the pick-up area sufficiently that it will not interfere with the second target part being retrieved. For example the multi-up effector body may be rotated by an angle (i.e. 30°) determined based upon the number of pick-up effectors on the multi-up effector body which allow clearance for the next respective effector to operate. The second effector is operated to pick-up the second target part. Once the parts have been picked up, the serial multi-up effector is moved to the placing area the multi-up effector moved to the appropriate position and the part is released onto the target location (710) by releasing each part and rotating or moving the multi-pickup effector to allow each part to be released. The multi-up effector may be moved to position the other part for placing at the target location and the part released (712).

In the method 700, it is assumed that the serial multi-up effector comprises two individual effectors, however, the multi-up effector may comprise more effectors, in which case each individual effector would be positioned to pick-up a part one after the other.

Figure 8:
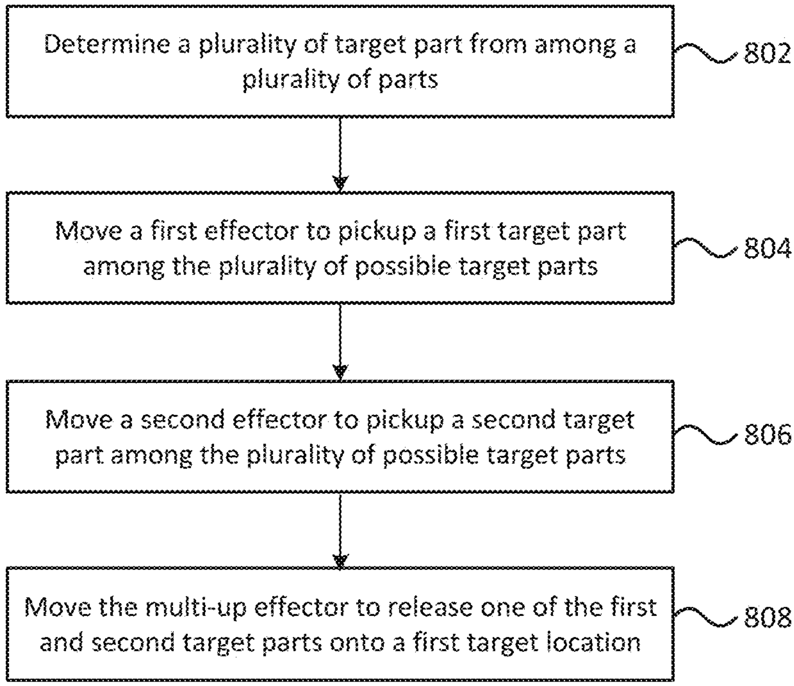
FIG. 8 depicts a further method of serially picking and placing parts using a multi-up effector.

FIG. 8 depicts a further method of serially picking and placing parts using a multi-up effector. The method 800 is similar to the method 700 described above, however, all of the target parts for subsequent picking are determined at the same time. The method determines a plurality of target parts from a plurality of parts (802). Similar to the method 700, the target parts may be determined using image processing techniques. In addition to determining a plurality of possible target parts to be picked, the image processing may additionally determine a picking order of the target parts. In determining the plurality of target parts, the processing may consider the picking order as well as whether any of the target parts may move as a result of picking one or more of the target parts. In addition to the use of image processing techniques to determine a plurality of parts that are suitable for picking, the determination may be done using simulation techniques in order to simulate and predict likely locations of parts after picking one or more parts.

After determining the plurality of target parts, the multi-up effector is moved to position one of the individual effectors in a pick-up position for one of the identified target parts (804). Once an effector is moved to the pick-up position, it is operated and the target part that is located in the pick-up area of the individual effector is picked up. The multi-up effector is then moved in order to position another individual effector into the pick-up position (806) by moving the multi-up effector to position the next pick-up effector over the target part. With the other individual effector moved to the pick-up position with another target part in the pick-up area, the individual effector is operated and the target part picked up. Once the target parts have been picked up by the multi-up effector, the effector is moved to the placing location and the individual effectors operated to release the parts into a desired placing location (808) or each pick-up effector is serial positioned above a deposit location by movement of the multi-up effector. The method 800 may deposit all of the held parts onto a target location simultaneously. When depositing all of the parts simultaneously, a parts tray may be used to position the placement locations relative to where the parts are held by the multi-up effector.

Figure 9:
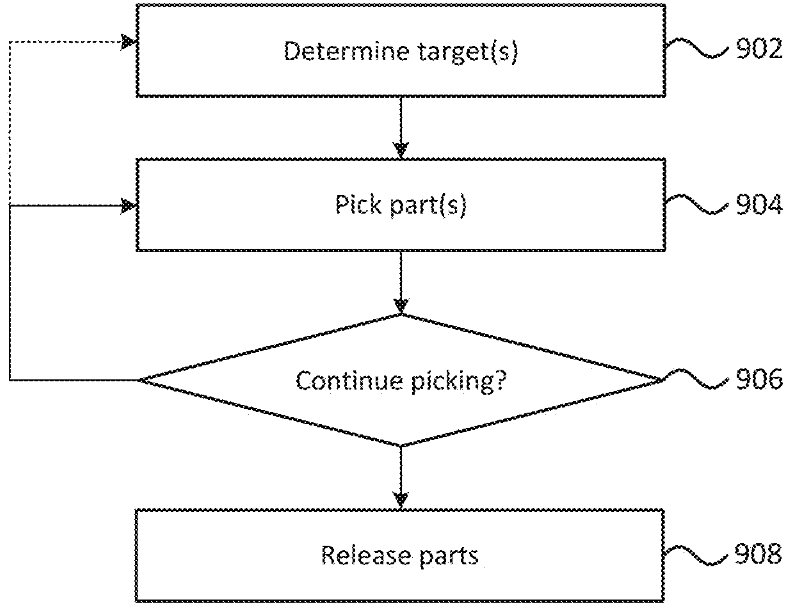
FIG. 9 depicts a further method of serially picking and placing parts using a multi-up effector.

FIG. 9 depicts a further method of serially picking and placing parts using a multi-up effector. The method 900 is similar to the methods 700 and 800 described above. The method 900 determines one or more target parts (902). The determination of the targets may be done using image processing techniques in order to identify one or more parts that may be targeted for being picked. If multiple parts are determined at once, the targets may be associated with a picking order specifying a possible sequence for picking the parts. The method 900 may then pick up one or more of the parts (904). If multiple parts are being picked, the parts are picked individually, with the serial multi-up effector moved for completing each pick of the target parts. Once a part is picked, the method may determine whether or not to continue picking (906). The determination of whether or not to continue picking may be based on various factors, including for example if the serial multi-up effector is full or if the target parts have been attempted to be picked up a number of times and as such the serial multi-up effector should stop attempting to pick up parts. If the picking is not to continue (No at 906), the serial multi-up effector is moved to an appropriate location and the parts released (908). Once the parts are released, the method 900 may return to pick up additional parts (904), which may include first determining one or more additional targets (902). Similarly, if the picking of parts is to continue (Yes at 906), the method may proceed to pick up one or more additional parts (904), which may have been previously identified. The picking up of the additional parts may include first determining one or more additional targets to be picked (902).

The above methods have been described with the assumption that each attempt at picking up a target part is successful. However, it is possible that one or more attempts at picking up a part may not be successful. The pick-up attempts may be repeated, possibly for a set number of retries, or the pick-up may move to another target part. Additionally, or alternatively, retrying to pick-up the same or alternative parts may be done using the same individual effector or a different individual effector.

As described above, a serial multi-up end effector may be used to pick-up multiple parts, one after the other, before moving to place the plurality of parts. The parts may be arranged within a bin or similar structure that can be placed at the pick-up area. The bin provides a plurality of parts to be picked and placed and allows the picking and placing operations to be performed for some time without stopping for refilling the parts. With the moving assembly robot, it may be unsafe for an individual to replace the bins without stopping the picking and placing, which can be undesirable given the length of time required for an individual to either replace an empty bin with a full bin, or fill the bin with additional parts. Further, as described with reference to FIGS. 1A and 1B, this may be done using a conveyor belt style device to deliver filled parts bin to the pick-up area and remove an empty parts bin from the pick-up area. While the conveyor belt style device may be used, it may require a relatively large foot print in order to deliver and remove the bins. Additionally, if multiple assembly line robots are used in the same area, it may be necessary to use multiple conveyor belt systems in order to deliver the filled bins and remove the empty bins. The use of multiple conveyors may use a large footprint, which can be undesirable, as well as being expensive. As described further below, a rotary table may be used to quickly replace multiple empty parts bins with filled parts bins.

Figure 10:
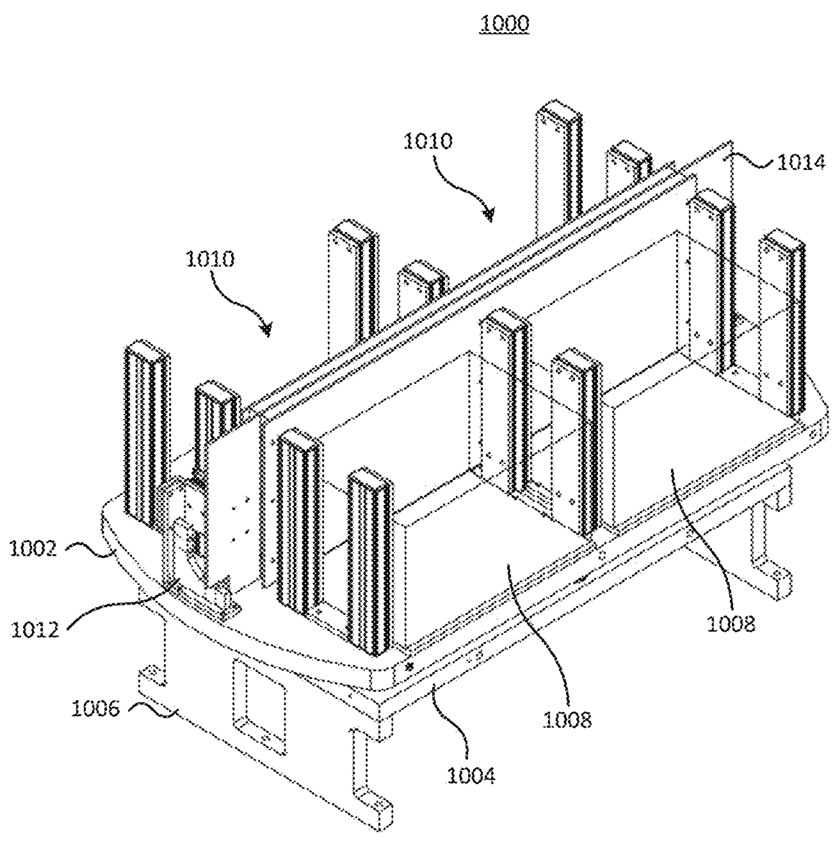
FIG. 10 depicts a rotary table for use in filling and placing bins of parts for use with an automated assembly line robot.
Figure 11:
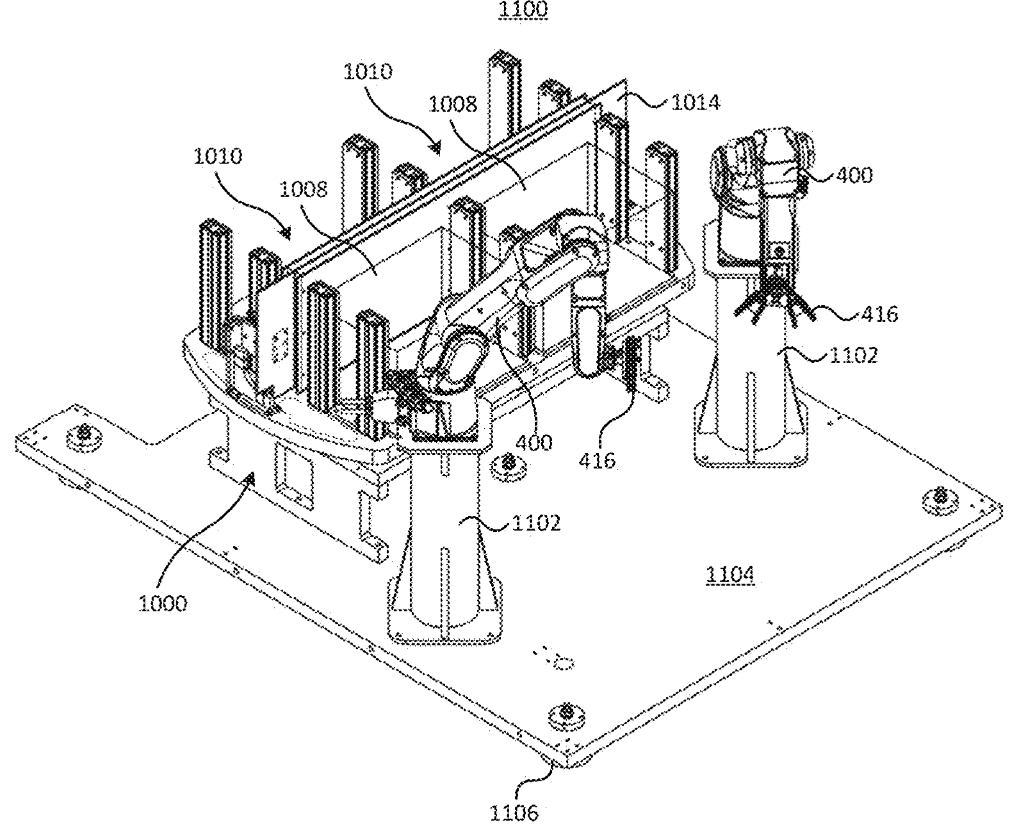
FIGS. 11-14 depict different views of an assembly station in an assembly line.

FIG. 10 depicts a rotary table for use in filling and replacing bins of parts for use with an automated assembly line robot. The rotary table 1000 comprises an upper table 1002 that is supported above a lower table 1004, which in turn may be supported by support legs 1006. The upper table 1002 provides areas 1008 for supporting parts bins that allow the parts to be picked from the bins. In addition to the picking areas 1008, the upper table also provides areas 1010 that allow bins to be filled with parts, or exchanged with filled bins. The filling areas 1010 and the picking areas 1008 are arranged on the upper surface such that when the upper table 1002 rotates, the bins present at the filling areas 1010 are rotated into the picking areas 1008, and the bins at the picking areas 1008 are rotated to the filling areas. The empty bins can then be filled or replaced with filled bins while the assembly line robot is picking and placing parts from the filled bins.

The upper table 1002 may be supported above the lower table by one or more bearing supports that provide sufficient support for the bins and parts, as well as allowing the upper table to rotate. An actuator may be mounted to both the lower table and the upper table in order to controllably rotate the upper table relative to the lower table.

In order to allow individuals to safely fill the bins with parts, or possibly replace the bins with filled bins, the rotary table 1000 may include a mounting support 1012 that supports a safety panel 1014 separating the bins in the picking area 1008 from those in the filling area 1010. The safety panel 1014 provides a separation between an operating area, where the assembly line robots can safely perform the picking and placing without risk of contacting an individual, and an area that allows individuals to fill the bins. The station may comprise a door that allows the individuals to enter the station and fill the bins. While the door is opening and individuals are present in the working area, the rotary table may be prevented from rotating. Once the door is closed and no individuals are present in the working area, the rotary table may be rotated. The safety panel 1014 allows for the assembly line robots to continue operating safely while an individual may be within the working area to replace or refill components on the rotary table.

The rotary table may be incorporated into an assembly line station that picks and places parts. The rotary table may be used to either replace empty bins with full bins for picking parts from, or may be used to replacing filled trays, or other components the parts are placed onto, with empty ones. The rotary table may be used with a serial multi-up pick and place effector as described above, or possibly with other types of effectors, including for example, parallel multi-up effectors, or single ended effectors.

FIGS. 11-14 depict different views of an assembly station in an assembly line. The assembly line station 1100 is depicted as having two assembly line robots 400 that are each mounted on a stand 1102 or similar structure. The stands 1102 position the assembly line robots 400 at a required working height. The stands 1102 and the assembly line robots 400 may be mounted on a ground plate 1104 which may be supported by a plurality of feet 1106. The feet 1106 may be adjustable in order level the ground plate 1104. It will be appreciated that the stands 1102 and the assembly line robots 400 may be mounted directly to a floor. The assembly station may be enclosed by a walls or panels (not shown) to provide a safe environment for the assembly line robots to operate. Additionally, the station may include one or more cameras or imaging devices (not shown) that are positioned to capture image data of the bins of parts in order to determine what parts may be picked.

The assembly line robots 400 are depicted as having serial multi-up effectors 416 mounted to them in order to serially pick and place multiple parts. The parts are picked from bins 1008 on a rotary 1000 and placed onto a target location. The parts may be placed on a target location, such as a parts trays on conveyors or other rotary tables, which are not depicted in FIGS. 11-14 for clarity of the figures.

Figure 12:
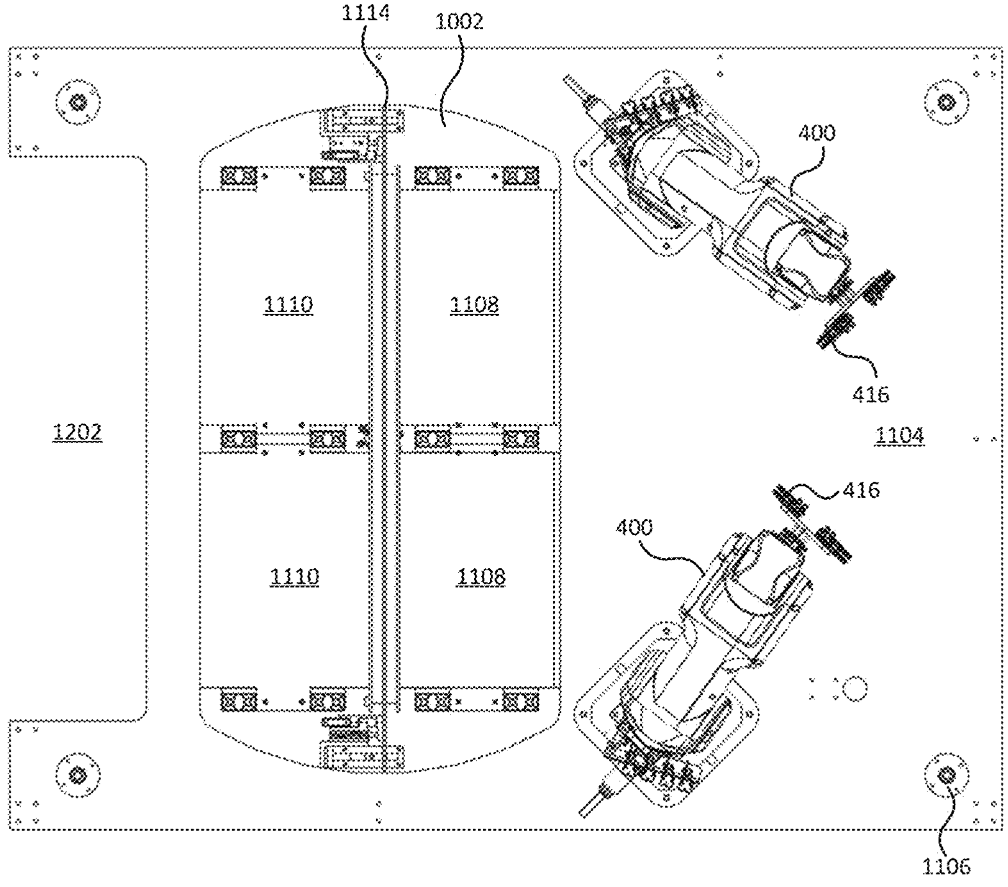
Figure 13:
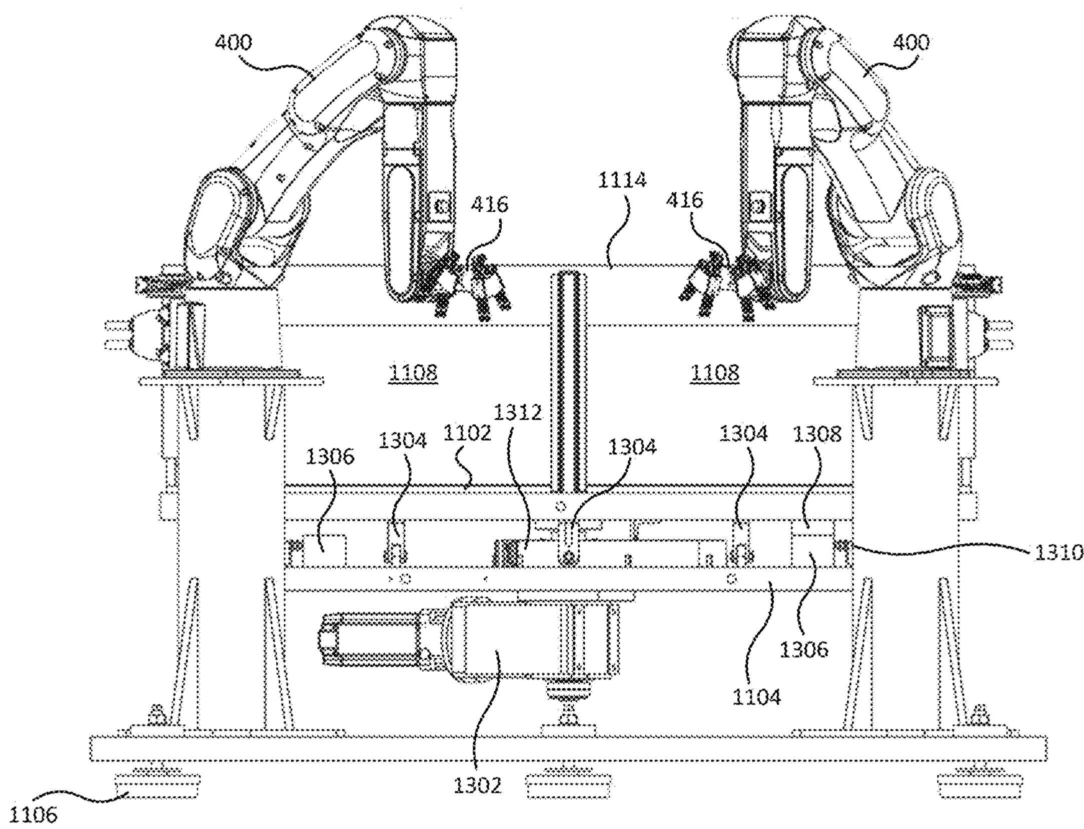
Figure 14:
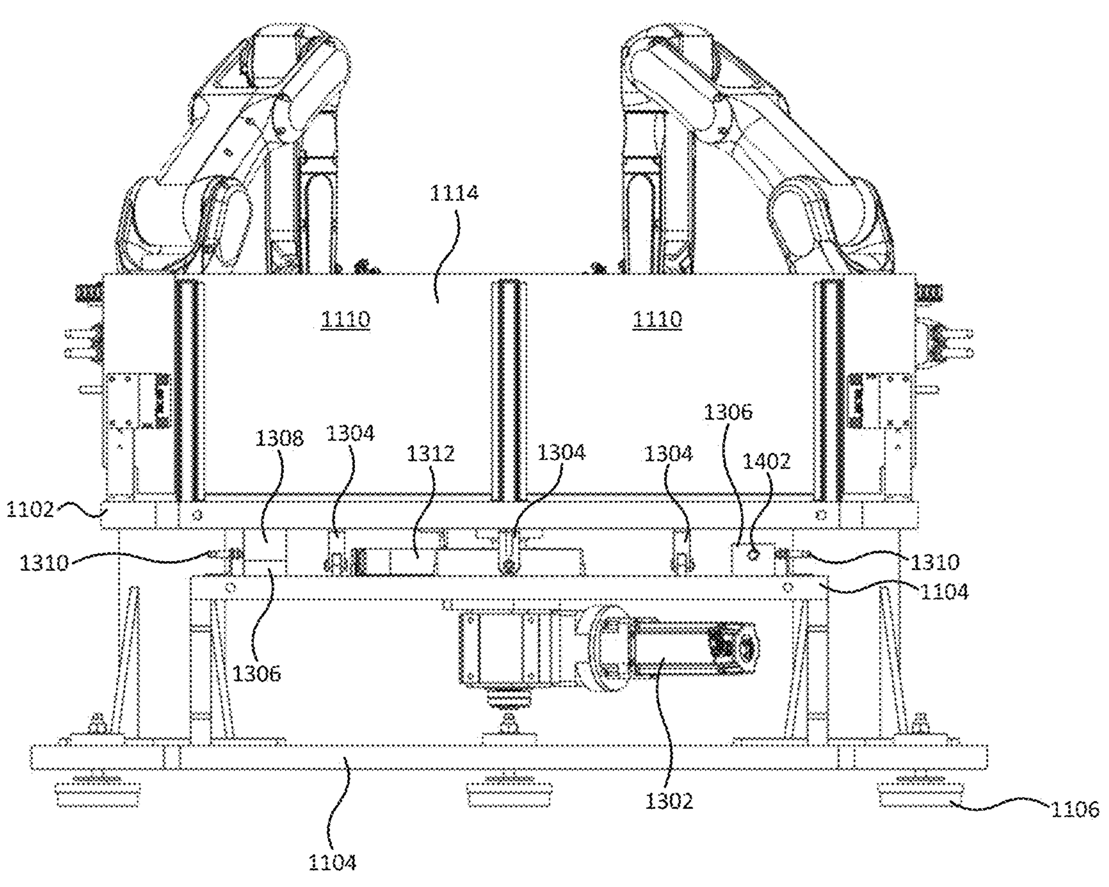

As most clearly see in FIG. 12, the assembly line station 1100 may provide a working area 1202 which allows individuals to fill bins that are on the filling locations 1010. The working area, and the filling locations 1010 are separated from the assembly line robot area, and picking locations 1008 by the safety panel 1014. Accordingly, the working area where individuals may be present either filing or replacing parts bins, is physically separated from the assembly line robots, thereby providing a safe working environment. While it is considered that an individual may fill the parts bins from the working area 1202, it is also contemplated that filled bins may be placed onto the filling area 1010 using an automated assembly robot. Filled bins may be placed in the working area 1202, for example on a rack, etc., in order to allow the filled bins to be placed into position on the rotary table by the robot. An individual may periodically replace a plurality of the bins, such as by replacing the rack of filled bins.

The rotary table 1000 allows empty bins of to be quickly replaced with filled bins, while providing a safe working area in a relatively small footprint. It is noted that while described as being empty, it is possible for some parts to remain in one or more of the bins. The rotary table comprises a rotary actuator 1302 that may be mounted to the lower table 1004 in order to secure the rotary actuator in place. A rotary output of the rotary actuator 1302 may be secured to the upper table 1002 in order to controllably rotate the upper table 1002 relative to the lower table 1004. The upper table 1002 may be supported by one or more bearing supports, which are depicted as roller supports 1304, although other types of bearings may be possible, such as low friction material on a support structure. The bearing supports 1304 are depicted as extending from the upper table and bearing against the lower table, however other arrangements are possible including, for example by extending away from the lower table and bearing against the upper table, or both. The bearing supports 1304 support the weight of the upper table 1002 and the parts bins, as well as any other structures supported by the upper table 1002, while still allowing the upper table 1002 to rotate.

The upper and lower tables may have rotation stops to stop the rotation of the table at the desired orientation. The rotation stops may comprise lower stop blocks 1306 secured to the lower table 1004. An upper stop block 1308 is secured to the upper table 1002 so that it contacts, or nearly contacts, a respective one of the lower stop blocks 1306 when the upper table is rotated into one of the positions that place bins in either the filling or picking locations. The stop blocks may have an adjustable stop, such as a bolt 1402 as seen most clearly in FIG. 14, or similar structure that can be screwed into or out of the blocks in order to adjust the position the table stops in. The rotary table may also include one or more position sensors 1310 for detecting a position of the rotary table.

A cable channel 1312 may be provided on the rotary table 1000 in order to provide a location to route cables. The cable channel can provide protection to the cables and prevent possible snags, pinches etc. of the cables when the table is rotated. The cables may include one or more of high voltage electrical wires, low voltage electrical wires, pneumatic tubes, hydraulic tubes, vacuum tubes, as well as other cables, wires, etc.

Figure 15:
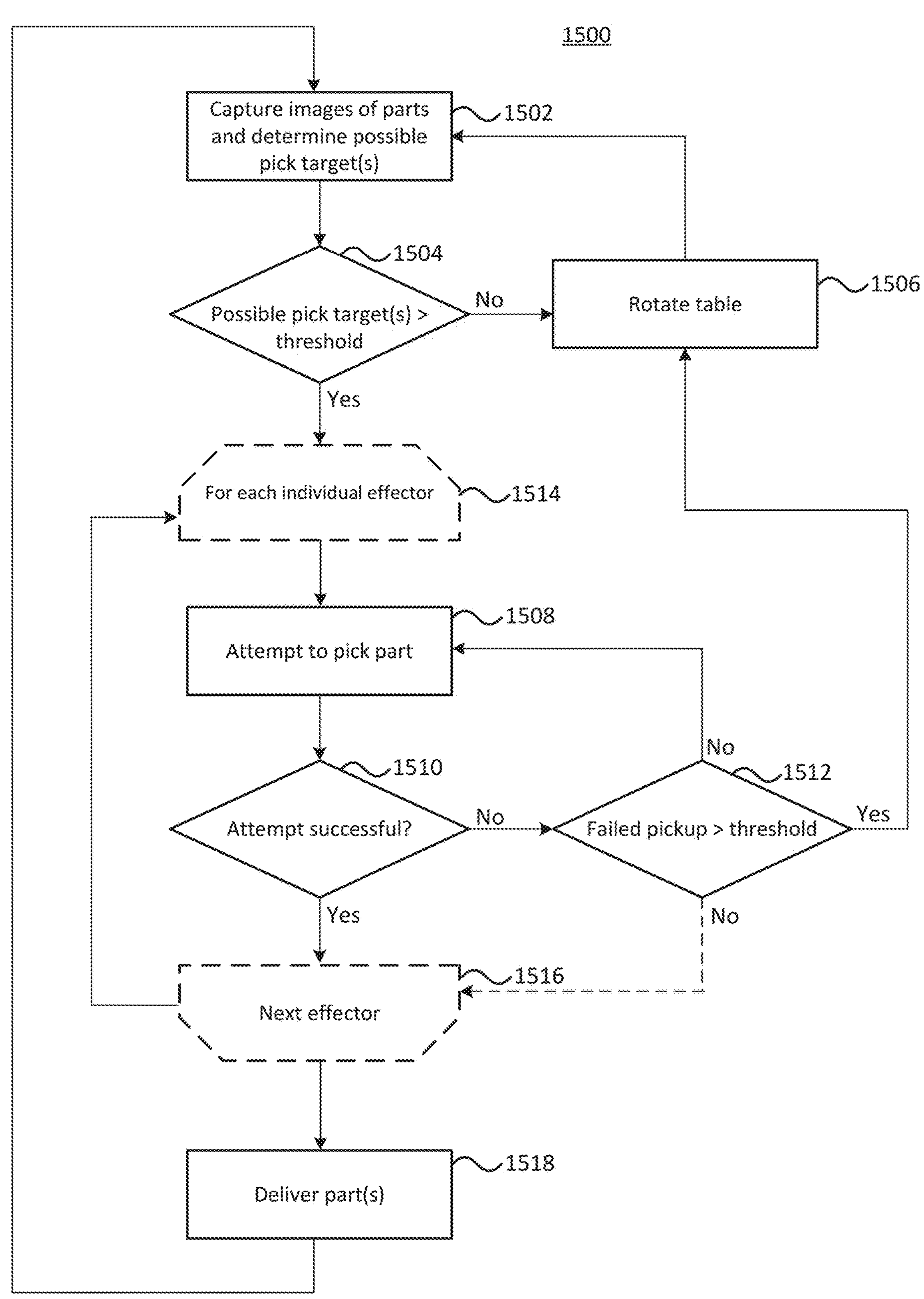
FIG. 15 depicts a method of operation a rotary table in an assembly line.

FIG. 15 depicts a method of operation a rotary table in an assembly line. The method 1500 captures images of a plurality of parts in a bin and determines a plurality of possible pick targets (1502). The pick targets comprise one or more parts in the bin that are in an orientation suitable for being picked. Determining the pick targets may also determine a picking order of the pick targets. The number of pick targets that are determined at a time may be equal to, or greater than, the number of individual effectors used by an automated assembly line robot. Even if there are still sufficient parts in the bin, there may be no possible pick targets for example if an orientation of a part blocks the remaining parts from being picked up. The method 1500 determines if the number of possible pick targets is above some threshold value (1504). The threshold value may be, for example the number of individual effectors or may be greater than the number of individual effectors to provide alternative parts to be picked. If the threshold is greater than the number of effectors, it is possible that the bin will not be completely empty of parts. Using a threshold that is less than the number of effectors may ensure that the parts bin is completely empty, however may require multiple pick-and-place operations using a multi-up effector that is not filled with parts. The setting of the threshold may be determined based on how likely successful picks of parts are, whether parts can be refilled from a partially empty bin, how long refiling from the partially empty bin takes, among other decisions. If the number of possible pick targets is below the threshold value (No at 1504), then the bin may be considered empty, even if it is not completely empty. Once the bin is considered empty, the table may be rotated (1506) in order to switch the empty bin for a full bin. If the assembly line station uses multiple automated assembly line robots, along with multiple picking bins, the table may be rotated to replace the picking bins with new filled bins once a single one of the picking bins is considered empty. Alternatively, the table may wait to rotate until all of the picking bins are considered to be empty. Rotating the table as soon as one bin is empty may be more effective as the parts from the partially empty bins may be used to refill the other bins and as such are not wasted.

If the number of possible pick targets is above the threshold (Yes at 1504), the effector is moved in order to attempt to pick-up one of the parts identified as a possible pick target (1508). Attempting to pick-up a part may include one or more pick-up movements. For example, if a first pick-up movement does not result in a successful pick-up, a second pick-up movement may be attempted and may for example drive or push the effector harder into the part to provide an improved vacuum seal. The determination of whether the attempt was successful (1510) can be determined based on vacuum sensor values. If the attempt to pick-up the part fails, that is the pick-up attempt is not successful (No at 1510), it is determined if the number of failed pick-up attempts is greater than some threshold value (1512). If the number of failed attempts is not greater than the threshold value (No at 1512, solid line), picking another part identified as a possible target may be attempted (1508). If the number of failed pick-up attempts is greater than a threshold value (Yes at 1512), the bin may be considered as being blocked from picking further parts. The number of failed pick-up attempts may be the number of failed attempts that have occurred in a row, in a period of time, or other criteria. Checking the number of failed pick-up attempts against a threshold may be done to provide an indication of whether it is worthwhile to continued attempting to pick-up parts from the current bin. If it is determined that it is no longer worth attempting to pick parts from the bin, that is the failed pick-ups is greater than the threshold, the bin may be considered as empty, even if there are parts remaining in the bin, and the rotary table can be rotated (1506) in order to swap the empty bin with a full bin.

If the pick-up attempt is successful (Yes at 1510), the picked up part can be delivered to the desired location (1518). Delivering a part may comprise dropping the held part from an effector onto a particular location, such as a parts tray or other structure. Once the part is delivered, the method can start over with capturing images and determining possible pick targets. Alternatively, if there are sufficient possible targets remaining, another part may be picked from among the previously identified pick targets.

The above has described a method of operating a rotary table with a single-up effector. A similar method may be used with multi-up effectors, such as those described above. The operation with the multi-up effector is depicted in FIG. 15 with dashed lines. If there are sufficient pick targets (Yes at 1504), then each of the multi-up effectors (1514) attempts to pick one of the parts (1508). If the number of failed pick-up attempts is less than the threshold (No 1512, solid line), the same effector may attempt to pick-up a different part (1508). Alternatively, if the number of failed pick-up attempts is less than the threshold (No at 1512, dashed line), the pick-and-place operation may move to the next effector (1516). The movement of the effector between the individual pick-ups may be determined when determining the pick targets (1502), in which case it may be simpler, and possibly faster, to proceed to attempt to pick-up the next part with the next effector as originally determined. Alternatively, the movement of the current effector to another target part may be determined. The pick-and-place operation may also move to the next effector when the pick-up attempt is successful (Yes at 1510). When moving to the next effector (1516), an attempt to pick-up another part (1508) is made using the next effector. Once all of the effectors have attempted to pick-up a part, the parts are delivered (1518), which may include individually delivering the held parts to a particular location.

It will be appreciated by one of ordinary skill in the art that the system and components shown in FIGS. 1-15 may include components and/or steps not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the components and processes described herein may be provided by various combinations of software, firmware and/or hardware, other than the specific implementations described herein as illustrative examples.

The techniques of various embodiments may be implemented using software, hardware and/or a combination of software and hardware. Various embodiments are directed to apparatus, e.g. a node which may be used in a communications system or data storage system. Various embodiments are also directed to non-transitory machine, e.g., computer, readable medium, e.g., ROM, RAM, CDs, hard discs, etc., which include machine readable instructions for controlling a machine, e.g., processor to implement one, more or all of the steps of the described method or methods.

Some embodiments are directed to a computer program product comprising a computer-readable medium comprising code for causing a computer, or multiple computers, to implement various functions, steps, acts and/or operations, e.g. one or more or all of the steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the method(s) described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope.

What is claimed is:

1. A multi-up effector for an assembly line robot capable of moving an end point of a movable assembly along one or more axes, the multi-up effector comprising:

a frame coupled to the end point of the moveable assembly providing a plurality mounting points; and a plurality of pick-up effectors, each of the individual effectors secured to a respective one of the plurality of mounting points of the frame and moveable between:

a pick-up position in which the respective individual effector is capable of picking up a part from among a plurality parts; and a holding position in which the respective individual effector is capable of holding the part to the respective individual effector while the multi-up effector is moved to place a different individual effector in the pick-up position.

2. The multi-up effector of claim 1, wherein the frame further comprises a connection for securing the frame to the end point of the moveable assembly.

3. The multi-up effector of claim 2, wherein the plurality of effectors are movable between the respective pick-up positions and holding positions by rotation of the frame about the connection.

4. The multi-up effector of claim 2, wherein the plurality of effectors are movable between the respective pick-up positions and holding positions by extending and retracting respective ones of the plurality effectors relative to the frame.

5. The multi-up effector of claim 1, wherein one or more of the plurality of effectors each comprise a vacuum based effector.

6. The multi-up effector of claim 5, wherein the vacuum tubes are slidable along a longitudinal axis of the vacuum tubes and biased towards a fully extended position by a spring element.

7. The multi-up effector of claim 1, wherein one or more of the plurality of effectors each comprise a mechanical effector movable to engage with a respective one of the plurality of parts.

8. The multi-up effector of claim 7, wherein the mechanical effector is slidable along the frame and biased towards a fully extended position by a spring element.

9. An assembly station for use in an assembly line comprising:

an assembly line robot comprising:

a moveable assembly comprising one or more actuators arranged to move an end point of the moveable assembly along one or more axes; and a multi-up effector coupled to the end point of the moveable assembly comprising a plurality of individual effectors, each of the individual effectors moveable between:

a pick-up position in which the respective individual effector is capable of picking up a part from among a plurality parts; and a holding position in which the respective individual effector is capable of holding the part to the respective individual effector while the multi-up effector is moved to place a different individual effector in the pick-up position;

a delivery assembly for positioning a bin filled with parts to a picking position to allow the multi-up effector to pick parts out from the bin and removing an at least partially empty bin from the picking position;

a removal assembly for positioning an empty part holder to a placing positon position to allow the multi-up effector to deliver the picked parts to the part holder and remove an at least partially filled parts holder from the placing position.

10. The assembly station of claim 9, wherein the delivery assembly comprises a rotary table having at least two bin locations, where respective ones of the two bin locations are rotatable between being located in either the picking position or a filling position.

11. The assembly station of claim 10, wherein the rotary table comprises a safety partition between the two bin locations.

12. The assembly station of claim 11, wherein the assembly line robot continues to operate while an operator is providing a filled parts bin at the filling position.

13. The assembly station of claim 12, wherein the filling position is located within a safety enclosure with a door and the rotary table is prevented from rotating when the door is open or while the operator is within the enclosure.

14. A method of picking and placing parts in an assembly line, the method comprising:

capturing image data of a plurality of parts arranged in a picking bin;

identifying one or more possible parts within the image data suitable for picking out of the picking bin;

moving a first effector of a multi-up effector arranged on an end point of an assembly line robot to a position to pick-up a first target part from the one or more possible parts and attempting to pick-up the first target part with the first effector;

moving the first effector to a holding position;

moving a second effector of the multi-up effector to a position to pick-up a second target part from among the plurality of parts and attempting to pick-up the second target part with the second effector; and moving the first and second effectors to deliver the respect target part to a first delivery target and second delivery target respectively.

15. The method of claim 14, wherein identifying one or more possible parts within the image data comprises identifying a plurality of possible parts, including the first target part and the second target part from the image data.

16. The method of claim 14, further comprising capturing additional image data of the plurality of parts after moving the first effector to the holding position and determining the second target part from the additional image data.

17. The method of claim 14, wherein moving the first effector and the second effector of the multi-up effector comprises rotating the multi-up effector about a connection point connecting the multi-up effector to an automated assembly robot.

18. The method of claim 14, wherein moving the first effector of the multi-up effector comprises extending the first effector away from a connection point connecting the multi-up effector to an automated assembly robot and moving the second effector of the multi-up effector comprises extending the second effector away from the connection point.

19. The method of claim 14, further comprising determining if the attempt to pick-up the first target part is successful and if the attempt is not successful determining if a number of failed pick-up attempts is greater than a threshold value and when the number of failed pick-up attempts is greater than the threshold value, replacing the picking bin with a new picking bin filled with parts.

20. The method of claim 19, wherein replacing the picking bin with the new picking bin comprises:

determining that a working area is clear of individuals and a door securing the working area is closed; and causing a rotary table to rotate in order to replace the picking bin with the new picking bin when the working area is clear and the door is closed.

* * * * *